(12) United States Patent
Amann et al.

(10) Patent No.: US 12,703,966 B1
(45) Date of Patent: Aug. 11, 2026

(54) SYSTEM AND METHOD FOR MITIGATING LEAKS IN PIPES

(71) Applicant: UIPCO, LLC, San Antonio, TX (US)

(72) Inventors: Manfred Amann, San Antonio, TX (US); Snehal Desai, Richardson, TX (US); Nicole Ferretti, Plano, TX (US); Martin Lopez, Frisco, TX (US); Michael J. Maciolek, Kerrville, TX (US); Donnette L. Moncrief Brown, San Antonio, TX (US); Melissa Jane Porter, Lutz, FL (US); Sayeef Rahim, Frisco, TX (US); Andrew Logan Taylor, San Antonio, TX (US); Joseph Michael Vesco, Sparks, NV (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/815,261

(22) Filed: Aug. 26, 2024

Related U.S. Application Data

(60) Provisional application No. 63/579,082, filed on Aug. 28, 2023.

(51) Int. Cl.
*E03B 7/07* (2006.01)
*G05B 11/32* (2006.01)
*G05B 11/58* (2006.01)
*G05B 23/02* (2006.01)

(52) U.S. Cl.
CPC .............. *E03B 7/071* (2013.01); *G05B 11/32* (2013.01); *G05B 11/58* (2013.01); *G05B 23/0205* (2013.01)

(58) Field of Classification Search
CPC ......... E03B 7/071; G05B 11/32; G05B 11/58; G05B 23/0205
USPC .................................. 137/1, 553, 551, 487.5
See application file for complete search history.

(56) References Cited

U.S. PATENT DOCUMENTS 5,347,264 A * 9/1994 Bjorkman ............... E03B 7/071 137/551
6,691,724 B2 * 2/2004 Ford ....................... E03B 7/071 137/59
7,177,725 B2 * 2/2007 Nortier ..................... E03C 1/00 702/49
8,364,546 B2 * 1/2013 Yenni ...................... H04L 67/12 702/56
8,561,636 B2 * 10/2013 Eithun ................ G01M 3/2815 73/40.5 R
8,667,978 B2 * 3/2014 Ford .................. G01M 3/2815 137/39
9,494,480 B2 * 11/2016 Klicpera ................. G01M 3/00
11,551,139 B1 * 1/2023 Finamore ............... G06N 5/047

(Continued)

*Primary Examiner* — Minh Q Le
(74) *Attorney, Agent, or Firm* — Plumsea Law Group, LLC

(57) ABSTRACT

Systems and methods for preventing leaks from plumbing systems in buildings as well as limiting water damage to buildings whenever leaks do occur include electronically actuated valves to shut off water to one or more pipes in order to reduce water pressure in those pipes. The systems and methods also include sensors to detect when a room in a building is occupied. A controller opens the electronically actuated valve associated to a fluid outlet (such as a faucet) in a particular room when the room is occupied. The controller closes the electronically actuated valve in the room when the room is unoccupied.

20 Claims, 7 Drawing Sheets

(56) References Cited

U.S. PATENT DOCUMENTS

| | | | | |
|---|---|---|---|---|
| 2014/0046716 | A1* | 2/2014 | Black | G06Q 10/06314 705/7.19 |
| 2014/0224340 | A1* | 8/2014 | Klee | G05D 7/0623 137/1 |
| 2014/0224350 | A1* | 8/2014 | Patel | E03B 7/071 137/78.1 |
| 2017/0131174 | A1* | 5/2017 | Enev | G01M 3/2815 |
| 2017/0285665 | A1* | 10/2017 | Nunally | E03B 7/071 |
| 2018/0216742 | A1* | 8/2018 | Korten | G01L 7/08 |
| 2019/0195374 | A1* | 6/2019 | Carpenter | E03B 7/071 |
| 2024/0219257 | A1* | 7/2024 | Dupont | G01M 3/243 |
| 2024/0288088 | A1* | 8/2024 | Donovan | E03B 7/072 |
| 2025/0122702 | A1* | 4/2025 | Perez | E03C 1/021 |

* cited by examiner

SYSTEM AND METHOD FOR MITIGATING LEAKS IN PIPES

CROSS-REFERENCE TO RELATED APPLICATIONS

This application claims the benefit of Provisional Patent Application No. 63/579,082 filed Aug. 28, 2023, and titled "System and Method for Mitigating Leaks in Pipes," which is incorporated by reference herein in its entirety.

TECHNICAL FIELD

The present disclosure generally relates to systems and methods for mitigating leaking pipes in a building.

BACKGROUND

Water damage to homes is one of the leading causes of insurance claims. Water damage can occur due to flooding, leaking rooves, leaking pipes, leaking appliances, or other causes. Often, water damage occurs when a tenant of a building is not around to notice leaks at various water sources, including faucets, toilets, and other sources. The longer the source goes unidentified, the more damage the leaking water can cause to a home, and the more costly repairs.

There is a need in the art for a system and method that addresses the shortcomings discussed above.

SUMMARY

In some aspects, the techniques described herein relate to a system for installation in a building, including: a water pipe manifold including: a manifold port; an electronically actuated valve disposed at the manifold port; and a controller for controlling the electronically actuated valve; a pipe assembly connected to the water pipe manifold at the manifold port; a fluid outlet connected to the pipe assembly, wherein the fluid outlet is accessible in a room of the building; a sensor associated with the room and in communication with the controller, wherein the sensor detects occupancy information for the room; wherein the controller receives information from the sensor, wherein the controller opens the electronically actuated valve when the sensor sends information indicating that the room is occupied and wherein the controller closes the electronically actuated valve when the sensor sends information indicating that the room is unoccupied.

In some aspects, the techniques described herein relate to a system for installation in a building, including: a pipe assembly; a water source connected to the pipe assembly, wherein the water source is accessible in a room of the building; an electronically actuated valve disposed within the pipe assembly, wherein when the electronically actuated valve is closed no water can pass to the water source from the pipe assembly; a sensor associated with the room, wherein the sensor detects occupancy information for the room; wherein the electronically actuated valve is open when the sensor detects that the room is occupied and wherein the electronically actuated valve is closed when the sensor detects that the room is unoccupied.

In some aspects, the techniques described herein relate to a method of mitigating water damage to a building, including: receiving information from a sensor; determining, based on the received information, that a room of the building is occupied; and allowing water within a pipe assembly to be pressurized based detecting that the room is occupied.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

The embodiments provide systems and methods for preventing leaks from plumbing systems in buildings as well as limiting (mitigating) water damage to buildings whenever leaks do occur. The exemplary systems and methods include electronically actuated valves to shut off water to one or more pipes to reduce water pressure in those pipes. The systems and methods also include sensors to detect when a room in a building is occupied. A controller opens the electronically actuated valve associated to a fluid outlet (such as a faucet) in a particular room when the room is occupied. The controller closes the electronically actuated valve in the room when the room is unoccupied.

Various terms and definitions are gathered here for convenience.

As used herein, the term "plumbing system" refers to a set of pipes, pipe connectors, pipe manifolds, faucets, toilets, and other fixtures that provide water to components of a home or building, as well as a means for draining the water.

As used herein, the term "pipe manifold" (or simply "manifold") refers to a collection of pipes or a bound header that facilitates transferring water between different points in a plumbing system.

As used herein, the term "water line" refers to a conduit for transporting water. Water lines could be conventional pipes, such as metal pipes (for example, copper pipes), which are relatively rigid. Water lines could also be plastic pipes or tubing that may be flexible, such as tubing constructed of cross-linked polyethylene (PEX). For convenience, the embodiments use the term "pipe" to mean any piping or tubing that can be used to deliver water or other fluids, and which may be flexible or rigid.

Figure 1:
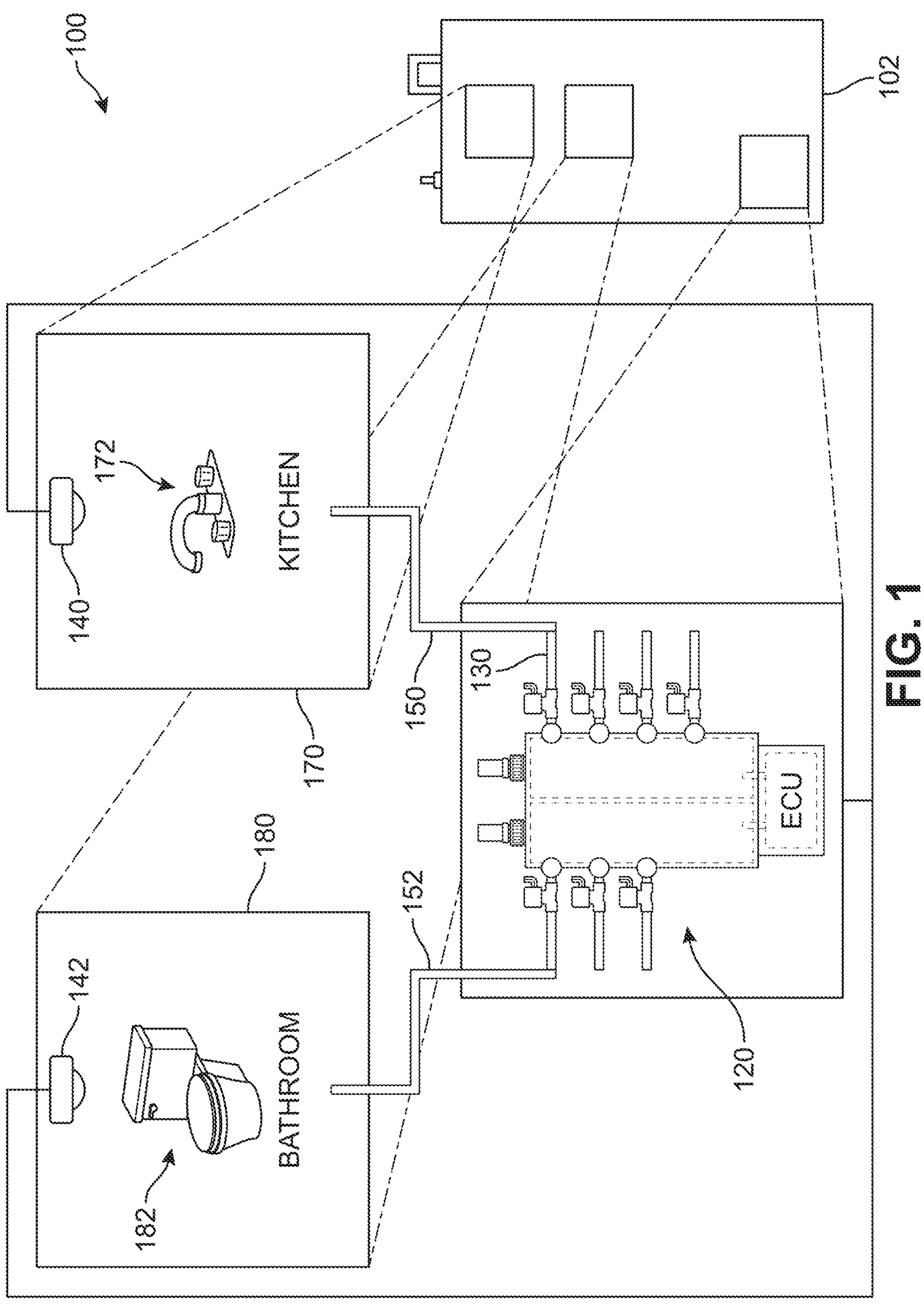
FIG. 1 is a schematic view of a leak prevention system for a building equipped with a plumbing system, according to an embodiment.

FIG. 1 is a schematic view of a leak prevention system 100 for a building 102 equipped with a plumbing system. Leak prevent system 100 may comprise various components that actively work to pressurize and depressurize water in pipes in one or more areas of a building in response to sensed information.

In the embodiment of FIG. 1, leak prevention system 100 may include a manifold 120 which is further connected to a plurality of pipes 130. Each of pipes 130 may be connected to manifold 120 via an inlet or outlet port.

Pipes 130 may be part of one or more pipe assemblies that extends through building 102. In particular, various pipes of plurality of pipes 130 may be in fluid communication with water outlets in one or more rooms of the building. As an example, a first pipe assembly 150 may extend through building 102 from manifold 120 to a faucet 172 in a kitchen 170. A second pipe assembly 152 may extend through building from manifold 120 to a toilet 182 in a bathroom 180.

The flow of water between manifold 120 and each of the water outlets, including faucet 172 and toilet 182, may be managed by automatically opening and closing valves disposed at the outlets of manifold 120. More specifically, the pressure of water within the respective pipes or pipe assemblies attached to these water outlets may be controlled by opening and closing valves at manifold 120.

Figure 2:
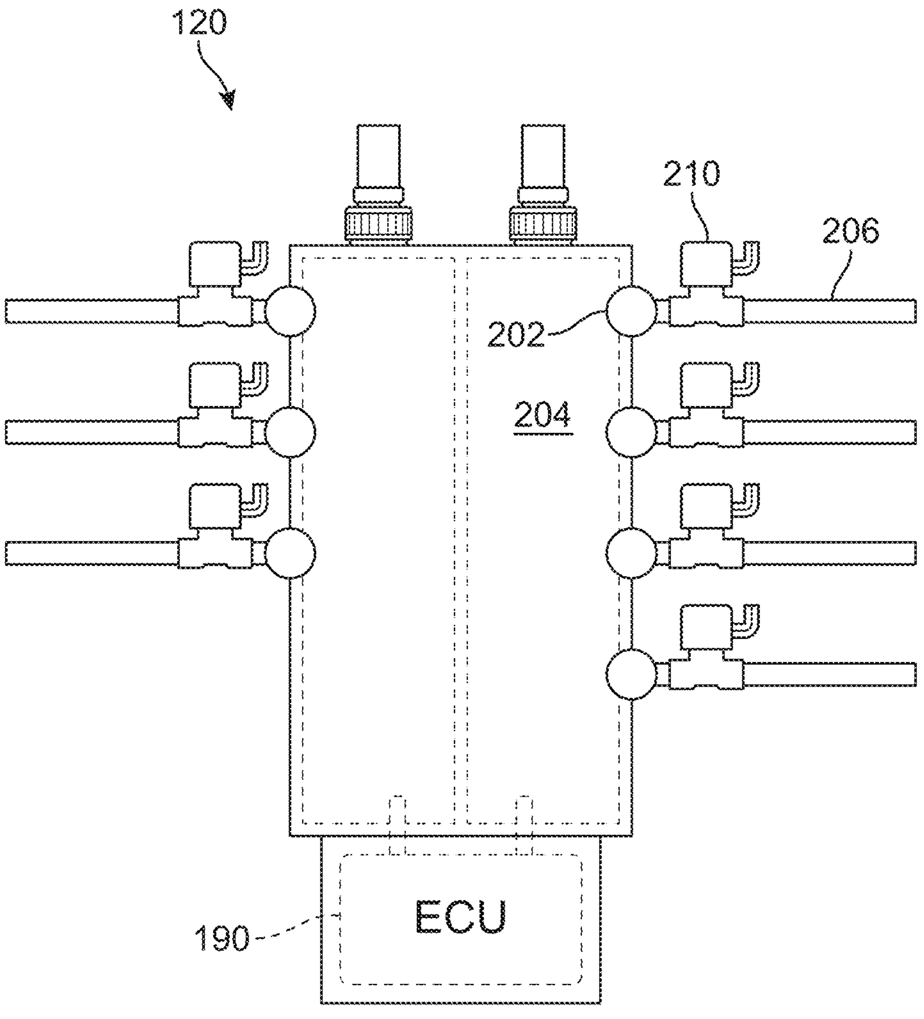
FIG. 2 is a schematic view of a manifold that may include electronically actuated valves at each outlet port, according to an embodiment.

As shown in FIG. 2, manifold 120 may comprise electronically actuated valves at each outlet port. As an example, a first outlet port 202 connects an interior cavity 204 of manifold 120 with one end of an electronically actuated valve 210 (or simply "valve 210"). A second end of valve 210 is connected to first pipe 206 of first pipe assembly 150. When valve 210 is in an open state, water can freely flow from interior cavity 204 to first pipe 206. Therefore, if water within interior cavity 204 is pressurized, water within first pipe 206 (and first pipe assembly 150) will be pressurized when valve 210 is open. When valve 210 is in a closed state, water can no longer flow from interior cavity 204 to first pipe 206. Moreover, with valve 210 closed, the water within pipe 206, and within pipe assembly 150, may be at a lower pressure than the water within interior cavity 204.

The embodiments may use any suitable electromechanically operated valve, including any suitable solenoid valves. Solenoid valves may be opened and closed in response to electromagnetic signals from other components, such as a control unit.

Manifold 120 may also include an electronic control unit 190, or "ECU 190", which may also be referred to as a controller. ECU 190 comprises a processor and/or memory that can be used to process incoming information and send control signals to one or more electronically actuated valves. In some cases, ECU 190 receives information from sensors disposed throughout building 102 and controls valves within manifold 120 in response.

Referring back to FIG. 1, leak prevention system 100 may further include one or more sensors, such as a first sensor 140 and a second sensor 142. Each sensor may be associated with a corresponding room and/or area of building 102. For example, first sensor 140 may be disposed in kitchen 170, while second sensor 140 may be disposed in bathroom 180.

Sensors may be configured to detect occupants in a room. In one embodiment, first sensor 140 and second sensor 142 may comprise occupancy sensors that detect when a room is occupied and/or unoccupied. Any suitable occupancy sensors could be used including sensors that use passive infrared, microwave, ultrasonic, and/or image processing technologies. Exemplary occupancy sensors can be installed into existing fixtures in a room such as lights, switches, or else independently placed or mounted in a room.

In some embodiments, occupancy sensors, motion sensors, or related sensors, could be integrated into an Internet of Things ("IoT") network within the building.

Information from first sensor 140, second sensor 142, as well as any other suitable sensing devices, including IoT devices, may be passed to ECU 190. This information can include any raw or processed signals related to occupancy, vacancy, and/or motion information in one or more rooms. Information could be passed by wired connections or using suitable wireless communication, such as Bluetooth, WiFi, or any other suitable wireless networks including any IoT device networks or other mesh networks.

Figure 3:
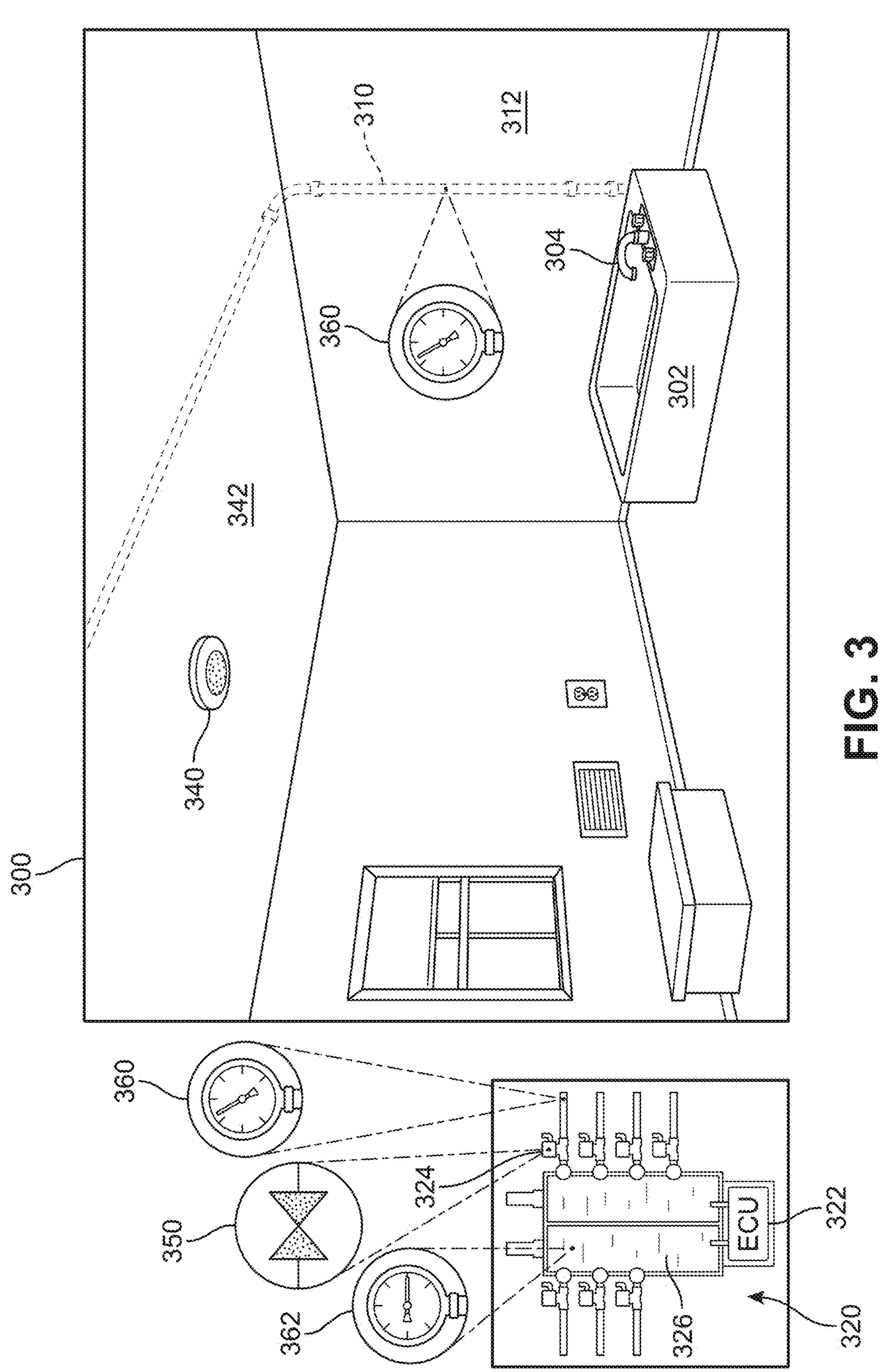
FIGS. 3 and 4 illustrate schematic views of an exemplary leak protection system in operation, according to an embodiment.
Figure 4:
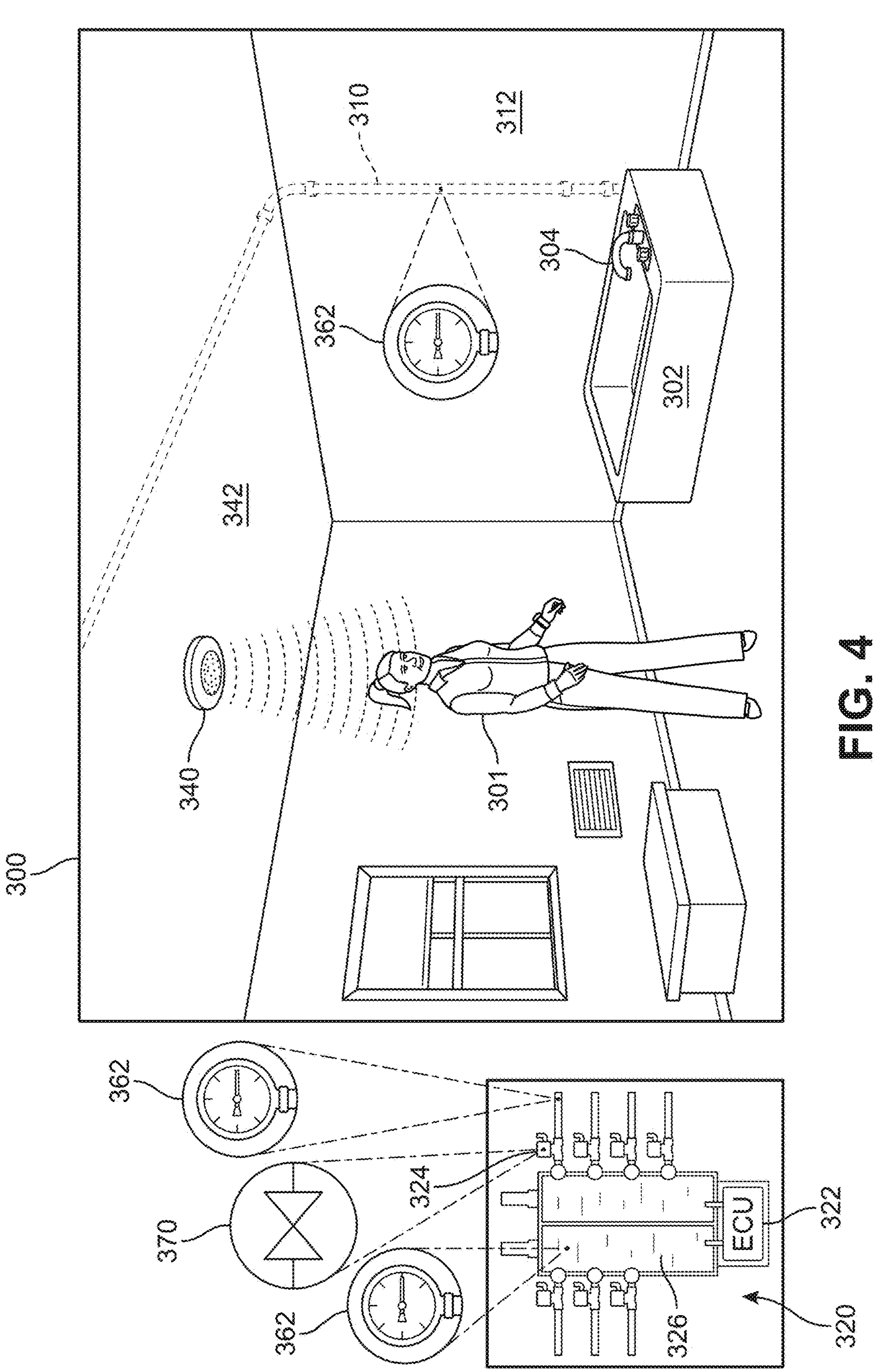

FIGS. 3 and 4 illustrate schematic views of the exemplary leak protection system in operation. Referring to FIGS. 3-4, a bathroom 300 includes a tub 302 with a faucet 304. Pipe assembly 310 (shown in phantom) runs behind wall 312 and connects faucet 304 with a manifold 320 that may be disposed in another area of the house. A sensor 340 is disposed on ceiling 342 and detects information that is used to determine whether the room is occupied or unoccupied.

In some embodiments, each sensor may operate in a first state (that is, an "occupied state") when one or more occupants are detected in an associated room and a second state (that is, an "unoccupied state") when no occupants are detected in the associated room.

Referring first to FIG. 3, sensor 340 detects that bathroom 300 is unoccupied and sends appropriate information corresponding to the unoccupied state to ECU 322 of manifold 320. Based on this information, ECU 322 has sent a control signal to close electronically actuated valve 324 (indicated schematically in FIG. 3 by closed valve symbol 350). This depressurizes water flowing through pipe assembly 310 (indicated schematically with low pressure reading 360), while interior cavity 326 of manifold 320 maintains a relatively higher pressure (indicated schematically with high pressure reading 362).

In this depressurized state, faucet 304, along with various sections of pipe assembly 310, is less likely to develop a leak. Moreover, if a leak does develop, the amount of water draining out will be limited by the volume of water in the pipe assembly at any given moment, since the supply of water from manifold 320 is cut off. This limits the amount of water damage that can be caused by water leaking on the floor and/or on other features of bathroom 300.

Referring now to FIG. 4, sensor 340 detects that bathroom 300 is occupied by a user 301 and sends appropriate information corresponding to the occupied state to ECU 322 of manifold 320. Based on this information, ECU 322 has sent a control signal to open electronically actuated valve 324 (indicated schematically by open valve symbol 370). This acts to pressurize water flowing through pipe assembly 310, matching the relatively high pressure of interior cavity 326 of manifold 320. That is, with valve 324 open, the pressure along pipe assembly 310 is relatively high (as indicated by high pressure reading 362 at manifold 320 and along pipe assembly 310).

In this pressurized state, user 301 can make use of faucet 304 as needed. When user 301 vacates bathroom 300, the system will automatically revert to the unoccupied state in which water in pipe assembly 310 is depressurized once again, thereby reducing the chances of a leak and/or limiting water damage from any leaks.

In some embodiments, a valve could be located along a pipe assembly to control the water pressure at a water outlet, rather than using valves at a manifold.

Figure 5:
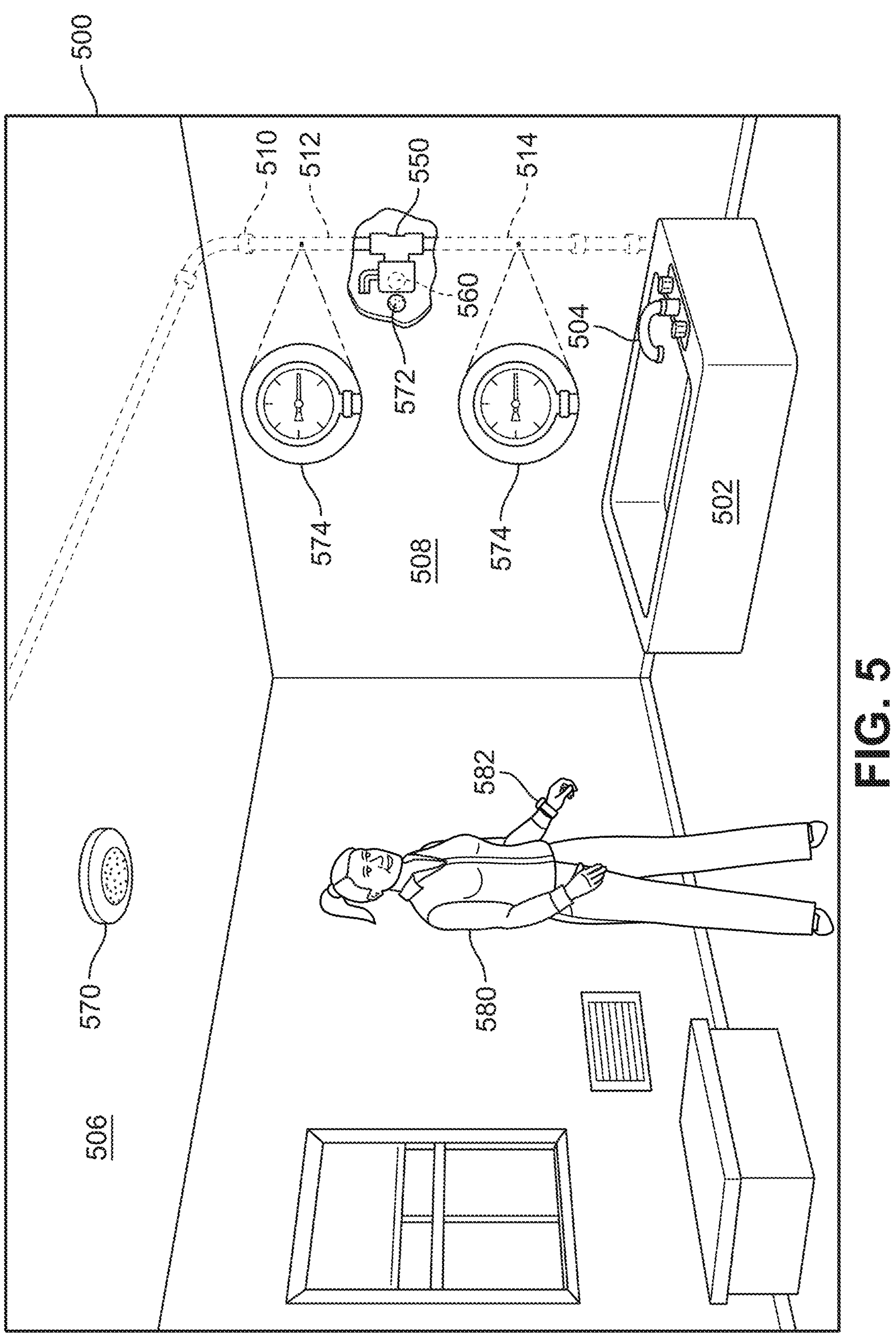
FIGS. 5 and 6 illustrate schematic views of another exemplary leak protection system in operation, according to an embodiment.

FIG. 5 is a schematic view of a bathroom 500 including a bathtub 502 and a faucet 504, according to an embodiment. A pipe assembly 510 runs behind wall 508 and connects faucet 504 with a water source inside or outside of the building (not shown).

As seen in FIG. 5, an electronically actuated valve 550 (or simply "valve 550") may be installed directly into pipe assembly 510 as part of a leak protection system. In particular, valve 550 connects a first pipe portion 512 with a second pipe portion 514 of pipe assembly 510. Here, second pipe portion 514 may connect directly to, or be located relatively closer to, faucet 504. When valve 550 is in an open state, water can freely flow from first pipe portion 512 to second pipe portion 514, and on to faucet 504. When valve 550 is in a closed state, water can no longer flow from first pipe portion 512 to second pipe portion 514. In particular, in the closed state, any water in second pipe portion 514 is depressurized relative to the water in first pipe portion 512.

The leak prevention system may also include an electronic control unit 560 ("ECU 560"), which receives information and sends commands to open and close valve 550. The leak prevention system may also include a first sensor 570, which may communicate with ECU 560. In some cases, leak prevention system 545 may further include a second sensor 572.

First sensor 570 may be mounted to ceiling 506 of bathroom 500. In some cases, first sensor 570 may be an occupancy sensor. Second sensor 572 may be disposed on or adjacent to valve 550. Second sensor 572 may be configured to receive signals from another device, which may be worn by, or otherwise associated with, a user 580. For example, second sensor 572 may be configured to detect radio signals transmitted by a wearable device 582 that is worn by user 580. In some embodiments, wearable device 582 could include an ultrawideband transmitter (or tag), while second sensor 572 may be a receiver that can detect ultrawideband transmissions, thereby detecting the presence of nearby users. In other embodiments, second sensor 572 could detect any other suitable kinds of transmissions from wearable device 582, including WiFi signals, Bluetooth signals, and Near Field Communication (NFC) signals. In some embodiments, second sensor 572 may determine that a room is occupied anytime it detects any kind of electromagnetic signal of sufficient strength indicating that a device that is typically worn or carried by a user is in the room. In other embodiments, second sensor 572 may determine that a room is occupied anytime it detects substantial increases in a particular type of electromagnetic signal indicating that a user wearing or carrying a device has recently entered the room. Similarly, in some embodiments, second sensor 572 may determine that a room is unoccupied anytime it detects substantial decreases in a particular type of electromagnetic signal indicating that a user wearing or carrying a device has recently left the room.

Although the embodiment depicts the use of two different kinds of sensors, in other embodiments only one type of sensor may be used.

Examples of wearable devices that could be detected by second sensor 572 include smart watches, smart rings, and other suitable wearable devices. In other embodiments, second sensor 572 could detect signals from a user's mobile phone or from other electronic devices that may be carried by a user.

Figure 6:
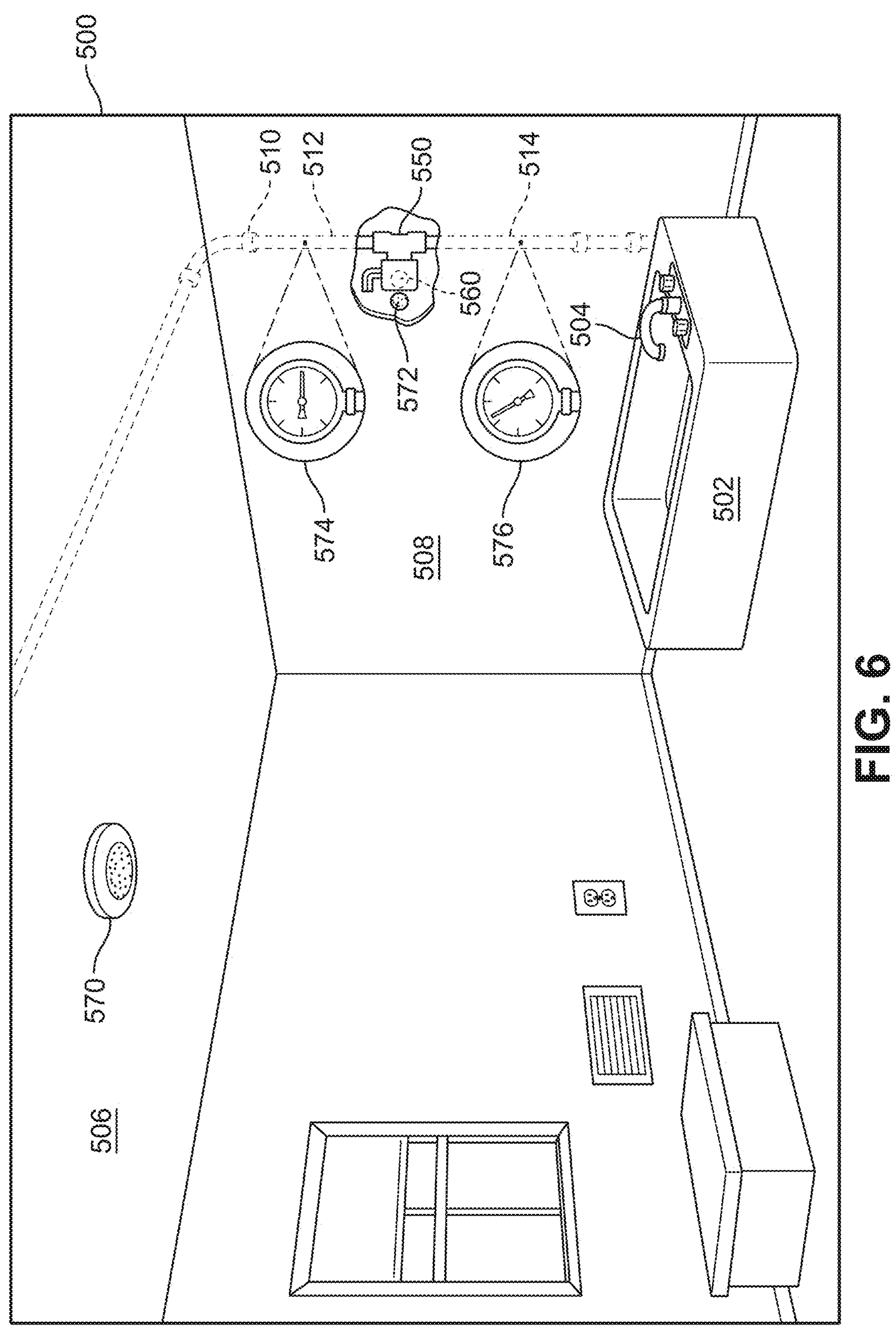

As shown in FIG. 5, with user 580 detected in bathroom 500 by one or both of first sensor 570 and second sensor 572, ECU 560 opens valve 550 so that the water in second pipe portion 514 is fully pressurized and user 580 can use faucet 504 without any issues. That is, with valve 550 open, first pipe portion 512 and second pipe portion 514 are both at the same pressure, as indicated by high pressure reading 574. As user 580 leaves bathroom 500, as seen in FIG. 6, and is no longer detected by either of first sensor 570 or second sensor 572, ECU 560 closes valve 550. This depressurizes the water in second pipe portion 514 (as indicated by low pressure reading 576), reducing the chances of a leak and/or reducing the potential water damage caused by any leaks.

It may be appreciated that features of the embodiment shown in FIGS. 5-6 may also be used with other embodiments, including the embodiment of FIGS. 1-4. For example, in some cases, embodiments could use manifolds with electronically actuated valves and sensors that can detect signals from devices worn or otherwise associated with users.

Figure 7:
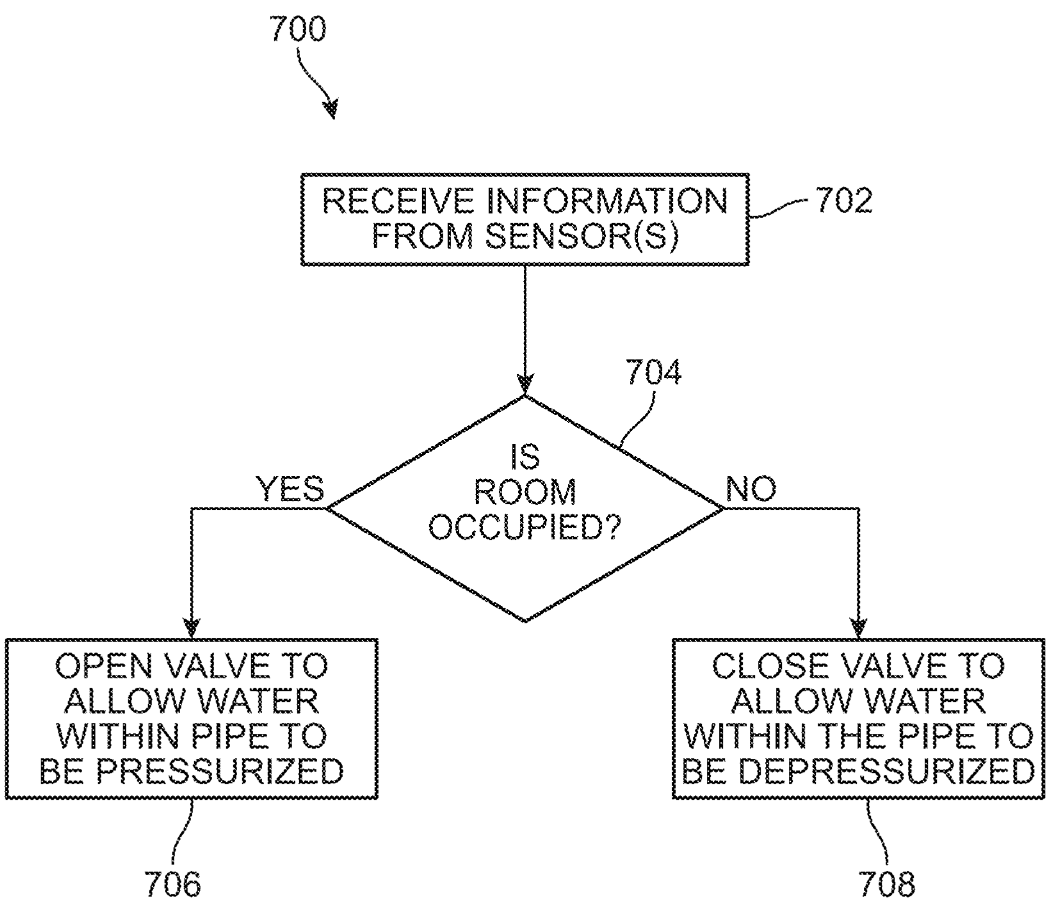
FIG. 7 is a schematic view of a process for controlling a leak protection system, according to an embodiment.

FIG. 7 is a schematic view of a process 700 for controlling a leak protection system, according to an embodiment. In some embodiments, one or more of the following steps could be performed by a control unit (such as ECU 190 of FIG. 1).

Starting in step 702, a control unit may receive information from one or more sensors. In some cases, the control unit could receive information from an occupancy sensor. In some cases, the occupancy sensor could transmit a state, such as a state corresponding to a room being occupied or a state corresponding to a room being unoccupied. In other cases, the occupancy sensor could transmit raw data that may be interpreted by the control unit to determine if the corresponding room is occupied or unoccupied. In other cases, the control unit could receive information from other kinds of sensors, such as a receiver that detects radio or other electromagnetic signals. For example, the control unit could receive information from a UWB sensor that detects the presence of a tag or transmitting device that may be worn by a user.

In step 704, the control unit checks the room occupancy state. That is, the control unit checks if the room is occupied or not occupied based on information from the one or more sensors. In some cases, the room occupancy state is provided directly by the sensors, while in other cases the room occupancy state may be inferred from raw sensor data.

If the room is occupied (meaning there are one or more users present), the control unit may proceed to step 706. In step 706, the control unit sends a command to open the electronically actuated valve within a pipe (or at a connection between a pipe and a manifold) to pressurize water at one or more water outlets in the room (for example, faucets).

If the room is determined to be unoccupied in step 704, the control unit may send a command to the close electronically actuated valve within the pipe (or at a manifold) to depressurize the water at one or more outlets in the room, as in step 708.

In embodiments where the leak prevention system is setup in multiple rooms within a building, each room may be equipped with one or more sensors. Moreover, in cases where a manifold is used, each outlet port may be equipped with a corresponding electronically actuated valve that controls water flow to different pipes, and ultimately to the various different rooms. As a user moves between rooms, the system may adjust the occupancy state of each room and open/close valves for each room according to occupancy state of each room.

There may be situations where it is undesirable to depressurize water in a room immediately after the room becomes unoccupied. For example, after a toilet is flushed it may take up to several minutes for the tank of the toilet to be refilled. If the water is depressurized in the bathroom immediately after an occupant uses the toilet and leaves, the water may be depressurized before the toilet tank can be completely filled. Therefore, in some embodiments, the water in a room may not be depressurized immediately in response to changes in the occupancy of a room. In some cases, for example, a system could wait a predetermined period after the occupancy has changed from occupied to unoccupied before depressurizing the water. In a bathroom, this configuration would allow a toilet tank to be filled before the water in the bathroom is depressurized, even if the bathroom becomes unoccupied immediately after the toilet is flushed.

In some embodiments, a control system could consider occupancy in adjacent rooms for controlling water pressure in a particular room. For example, to determine if water in a first room should be pressurized, the system may check for occupancy in the first room, as well as for occupancy in a second room and a third room which are both adjacent to the first room. In some cases, the system could pressurize water in a selected room anytime an adjacent room is occupied, even if the selected room is unoccupied, since occupancy in an adjacent room could be indicative that the selected room may be occupied soon. For example, in a situation where a first room is unoccupied but a second adjacent room is occupied, a system may act to pressurize water in the first room in case occupants from the second room move to the first room.

In some cases, the system could depressurize the water in a selected room only when all rooms in a set of adjacent rooms are unoccupied. For example, consider a situation where the water is pressurized in a first room because of the presence of a single occupant in the first room. If the single occupant leaves the first room and moves to an adjacent second room, the system may not immediately depressurize the water in the first room. Instead, the system may wait until the single occupant leaves the second room so that the first room and all adjacent rooms are unoccupied before depressurizing the water in the first room.

In some embodiments, rooms may be grouped together into zones that may be pressurized and depressurized together, based on occupancy information from one or more rooms within each zone. For example, in one embodiment all the rooms on a second floor of a house could comprise a single zone that is pressurized whenever any room in the zone is occupied and depressurized otherwise.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A system for installation in a building, comprising:

a water pipe manifold including:

a manifold port;

an electronically actuated valve disposed at the manifold port; and a controller for controlling the electronically actuated valve;

a pipe assembly connected to the water pipe manifold at the manifold port;

a fluid outlet connected to the pipe assembly, wherein the fluid outlet is accessible in a room of the building;

a sensor associated with the room and in communication with the controller, wherein the sensor is configured to detect radio signals from a wearable device, and wherein the sensor detects occupancy information for the room based on the detected radio signals;

wherein the controller receives information from the sensor, wherein the controller opens the electronically actuated valve when the sensor sends information indicating that the room is occupied and wherein the controller closes the electronically actuated valve when the sensor sends information indicating that the room is unoccupied.

2. The system according to claim 1, wherein the fluid outlet is associated with a faucet.

3. The system according to claim 1, wherein the sensor is an occupancy sensor.

4. The system according to claim 1, wherein the sensor detects motion in the room.

5. The system according to claim 1, wherein the sensor detects radio signals from another device.

6. The system according to claim 1, wherein the water pipe manifold is located in another room of the building.

7. A system for installation in a building, comprising:

a pipe assembly;

a water source connected to the pipe assembly, wherein the water source is accessible in a room of the building;

an electronically actuated valve disposed within the pipe assembly, wherein when the electronically actuated valve is closed no water can pass to the water source from the pipe assembly; and a sensor disposed adjacent to the electronically actuated valve, wherein the sensor is configured to detect radio signals from a wearable device and wherein the detected radio signals are used to determine room occupancy;

wherein the electronically actuated valve is open when the sensor detects the radio signals indicating room occupancy from the wearable device.

8. The system according to claim 7, wherein the electronically actuated valve is disposed in a wall of the room.

9. The system according to claim 7, wherein the sensor is disposed in the room.

10. The system according to claim 8, wherein the sensor is disposed in the wall.

11. The system according to claim 7, wherein the sensor is an occupancy sensor.

12. The system according to claim 7, wherein the sensor detects motion in the room.

13. The system according to claim 7, wherein the wearable device comprises one of a smart watch or a smart ring.

14. A method of mitigating water damage to a building, comprising:

detecting, with a sensor, radio signals from a wearable device;

determining, based on the detected radio signals, that a room of the building is occupied; and controlling an electronically actuated valve to allow water within a pipe assembly to be pressurized based on detecting the radio signals from the wearable device indicating that the room is occupied.

15. The method according to claim 14, the method further comprising:

receiving additional information from the sensor;

determining at a later time, based on the received additional information, that the room of the building is unoccupied; and allowing water within the pipe assembly to be depressurized based detecting that the room is unoccupied.

16. The method according to claim 14, wherein the sensor is an occupancy sensor.

17. The method according to claim 15, wherein allowing water in the pipe assembly to be pressurized comprises opening an electronically actuated valve.

18. The method according to claim 15, wherein allowing water in the pipe assembly to be depressurized comprises closing an electronically actuated valve.

19. The method according to claim 17, wherein the method further includes:

receiving the information from the sensor at an electronic control unit; and sending a command to open the electronically actuated valve.

20. The method according to claim 18, wherein the method further includes:

receiving the additional information from the sensor at an electronic control unit; and sending a command to close the electronically actuated valve.

* * * * *